US00RE44322E

(19) United States
(12) Reissued Patent
Yamaura et al.

(10) Patent Number: US RE44,322 E
(45) Date of Reissued Patent: Jun. 25, 2013

(54) MOBILE RADIO COMMUNICATION SYSTEM

(75) Inventors: Tomoya Yamaura, Tokyo (JP); Kazuyuki Sakoda, Tokyo (JP); Mitsuhiro Suzuki, Tokyo (JP)

(73) Assignee: Sony Corporation, Tokyo (JP)

(21) Appl. No.: 13/524,238

(22) Filed: Jun. 15, 2012

Related U.S. Patent Documents

Reissue of:
(64) Patent No.: 6,263,205
Issued: Jul. 17, 2001
Appl. No.: 09/296,416
Filed: Apr. 23, 1999

(30) Foreign Application Priority Data

Apr. 27, 1998 (JP) ..... 10-0117507

(51) Int. Cl.
*H04W 36/00* (2009.01)
*H04B 7/00* (2006.01)
*H04W 36/30* (2009.01)
*H04W 52/24* (2009.01)

(52) U.S. Cl.
CPC ..... *H04W 36/30* (2013.01); *H04W 52/24* (2013.01)
USPC ..... 455/442; 455/436; 455/522; 455/69; 370/331

(58) Field of Classification Search
USPC ..... 455/436–444, 522; 370/331
See application file for complete search history.

(56) References Cited

U.S. PATENT DOCUMENTS 5,491,837 A * 2/1996 Haartsen ..... 455/62
5,771,451 A * 6/1998 Takai et al. ..... 455/442
5,845,212 A * 12/1998 Tanaka ..... 455/437
5,940,743 A * 8/1999 Sunay et al. ..... 455/69
5,960,347 A * 9/1999 Ozluturk ..... 455/442
6,021,123 A * 2/2000 Mimura ..... 370/331
6,055,427 A * 4/2000 Ojaniemi ..... 455/436
6,070,075 A * 5/2000 Kim ..... 455/437
6,073,025 A * 6/2000 Chheda et al. ..... 455/522
6,574,211 B2 6/2003 Padovani et al.

FOREIGN PATENT DOCUMENTS

DE 69832405 T2 7/2006
DE 69837101 T2 10/2007
EP 0360615 3/1990
EP 0400906 12/1990

(Continued)

OTHER PUBLICATIONS

Ling et al., "Behavior and performance of power controlled IS-95 reverse-link under soft hand-off", IEEE Vehicular Technology Conference, US, New York, IEEE, vol. 47. 1997,pp. 924-928.
TR 101146 V3.0.0, "Universal Mobile Telecommunications System (UMTS); UMTS Terrestrial Radio Access (UTRA): Concept Evaluation (UMTS 3.0.0 version 1997)", 1997.

(Continued)

*Primary Examiner* — Duc M Nguyen
(74) *Attorney, Agent, or Firm* — Kenyon & Kenyon LLP

(57) ABSTRACT

A mobile radio communication system of the cellular system wherein a base station and a mobile station are connected to each other. Particularly, a mobile radio communication system wherein transmission power control is performed by a base station constructed such that, at least with regard to a control signal, soft hand-off control wherein a mobile station and base stations are connected simultaneously to each other is performed, but with regard to any other signal other than the control signal, hard hand-off control is performed. By the construction, the communication capacity of the entire system can be increased and the stability can be maintained.

24 Claims, 5 Drawing Sheets

FOREIGN PATENT DOCUMENTS

| | | | |
|---|---|---|---|
| EP | 0 667 726 | A2 | 8/1995 |
| EP | 0 671 819 | A2 | 9/1995 |
| EP | 0667726 | | 9/1995 |
| EP | 0671819 | | 9/1995 |
| EP | 0726659 | | 8/1996 |
| EP | 0778566 | | 6/1997 |
| EP | 1 021 874 | B1 | 11/2005 |
| EP | 1 029 419 | B1 | 2/2007 |
| WO | 95/12297 | A1 | 5/1995 |
| WO | 9512459 | | 5/1995 |
| WO | 99/13652 | A2 | 3/1999 |
| WO | 99/23844 | A2 | 5/1999 |

OTHER PUBLICATIONS

Communication from German Federal Patent Court for European Patent No. 0 954 194B1 for *LG Electronics Deutschland GmbH* vs. *Sony Corporation;* dated May 25, 2011.

Communication from Mannheim Regional Court for European Patent No. 0 954 194B1 dated Jul. 28, 2011.

Fuyun Ling, et al., "Behavior and Performance of Power Controlled IS-95 Reverse Link Under Soft Handoff", May 4, 1997, IEEE, pp. 924-928.

* cited by examiner

MOBILE RADIO COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

This invention relates to a mobile radio communication system of the cellular system wherein a base station and a mobile station are connected to each other, and more particularly to a mobile radio communication system wherein soft hand-off processing is performed with regard to a forward link transmission signal when a mobile station moves between cells.

In a cellular system of the direct spread CDMA (Code Division Multiplex Access) system, in order to maximize the communication capacity for reverse link transmission signals, transmission power control of mobile stations is usually performed to avoid a near-far problem. To this end, in a descending channel, a base station transmits transmission power control signals to mobile stations. On the other hand, in a cellular system of the direct spread CDMA system, each of a base station and a mobile station has a plurality of demodulators so that it may perform separation of multi-path components and soft hand-off processing.

The soft hand-off processing is performed because, as shown in FIG. 5, when a mobile station 103 moves from a cell 101 to another cell 102 and comes to a position in an overlapping portion 104 between the two cells 101 and 102, deterioration of the quality of a signal which the mobile station 103 receives from a base station 105a of the cell 101 occurs. Thus, as the soft hand-off processing, substantially same signals are transmitted from the base station 105a and another base station 105b of the cell 102 to the mobile station 103 so that the mobile station 103 may demodulate and compose the signals from the two base stations 105a and 105b to obtain a signal of an improved signal quality. Also with regard to a reverse link, a signal transmitted from the mobile station 103 is de modulated and composed by the base stations 105a and 105b to improve a signal quality.

In this instance, transmission power control signals from the base stations 105a and 105b are each generated independently by the base stations 105a and 105b, respectively. This is because, when a transmission power control signal is transmitted only from the base station 105a to the mobile station 103 provided the mobile station 103 performs such processing as described above to control the transmission power, so that the base station 105a can receive the signal of an optimum level and then performs transmission with the controlled transmission power, there is the possibility that the signal transmitted from the mobile station 103 may be an unexpected signal and may be a significant disturbance to the other base station 105b. Then, the mobile station 103 demodulates the transmission power control signals from the two base stations 105a and 105b independently of each other and composes the demodulated transmission power control signals. More particularly, the mobile station 103 increases its transmission power only when, for example, the transmission power control signals from both of the base stations 105a and 105b exhibit "up", but when the transmission power control signal from at least one of the base stations 105a or 105b exhibits "down", the mobile station 103 decreases the transmission power. The mobile station 103 transmits a reverse link signal with an appropriate transmission power to the base stations 105a and 105b by receiving and demodulating the transmission power signals from the base stations 105a and 105b independently of each other in this manner.

As described above, for a cellular system which adopts the direct spread CDMA system, transmission power control of a mobile station is an essentially required technique. Further, in the cellular system, in order to maximize the communication capacity of the entire system, interference must be suppressed to the minimum. To this end, in the cellular system, soft hand-off processing is performed. Upon such soft hand-off, the mobile station 103 must perform transmission power control by demodulating and composing different transmission power control signals from the two base stations 105a and 105b.

In this instance, if the threshold level of the communication quality with which soft hand-off is to be started is set at a lower level, then the number of mobile stations which must perform soft hand-off when a communication resource for a plurality of channels is used increases, and this gives rise to a problem that the communication capacity of the entire system decreases.

On the contrary if the threshold level of the communication quality with which hand-off is to be started is set at a higher level, then since the probability that the mobile station 103 may be present in a region in which hand-off is to be performed decreases, the frequency of soft hand-off can be decreased, and thus the communication capacity of the entire system can be increased. However, the possibility that a communication signal to the adjacent base station 105b may be disturbed increases, and this gives rise to a problem that not only the capacity of the entire system is decreased due to the interference, but also the stability of the entire system is deteriorated.

Further, when the mobile station 103 is positioned in the region in which hand-off is to be performed, if the communication capacity of the base station 105b of the destination of the hand-off has reached its limit value, then soft hand-off is not performed, but hard hand-off by which the frequency channel is changed is performed. In this instance, if a communication channel is transmitted from the mobile station 103 in a reverse link in a frequency channel which has been used before the hard hand-off is performed, this gives an unexpected significant disturbance to communication signals being handled by the base station 105b, presenting a problem that communication of other mobile stations is disturbed.

SUMMARY OF THE INVENTION

It is an object of the present invention to provide a mobile radio communication system which assures a maximum capacity of the entire system while performing soft-hand off and performs control of the mobile station transmission power appropriately to secure the safety of the entire system.

In order to attain the object described above, according to the present invention, there is provided a mobile radio communication system, comprising at least two adjacent base stations, a mobile station movable between cells formed by and connectable to the base stations, and means for performing transmission power control such that, at least with regard to a control signal, soft hand-off control wherein the mobile station and the base stations are connected simultaneously to each other is performed, but with regard to any signal other than the control signal, hard hand-off control is performed.

In the mobile radio communication system, when hand-off processing is to be performed, since each of the base stations performs soft hand-off control for connecting the base stations simultaneously to the mobile station at least with regard to a forward link control signal but performs hard hand-off control with regard to any signal other than the forward link control signal, the communication capacity of the entire system is increased when compared with an alternative system wherein each base station performs soft hand-off control with regard to both a forward link control signal and an information signal representing voice and so forth other than the forward link control signal. Further, with the mobile radio communication system, since at least a forward link control signal is transmitted to the mobile station, the stability of the entire system can be maintained. Furthermore, with the mobile radio communication system, even if the communication capacity of the entire system is used fully, since the base station of the destination of hand-off transmits only a forward link control signal to the mobile station to perform soft hand-off processing in order to minimize possible interference which may be had on the other communications, the base station of the destination of hand-off is prevented from receiving a reverse link signal of an unexpected transmission power, and consequently, the safety of the system can be augmented.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENT

An explanation of embodiments of the present invention will be given with reference to the drawings as follows.

Figure 1A:
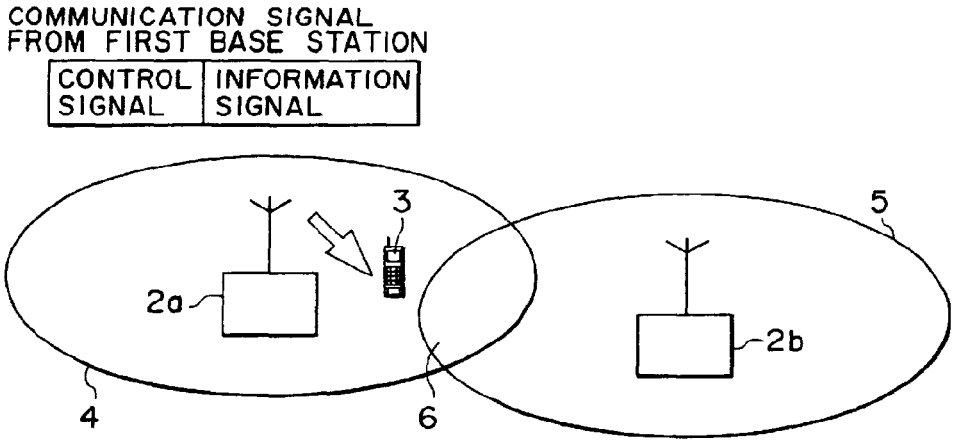
FIG. 1A is a schematic view illustrating a forward link signal transmitted from a first base station to a mobile station when the mobile station is positioned in a first region.
Figure 1B:
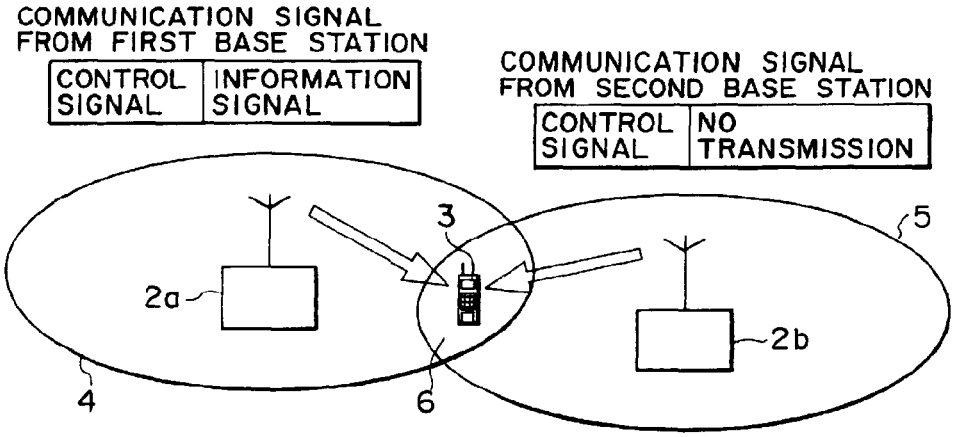
FIG. 1B is a schematic view illustrating forward link signals transmitted from the first base station and a second base station to the mobile station when the mobile station is positioned in an overlapping region.
Figure 1C:
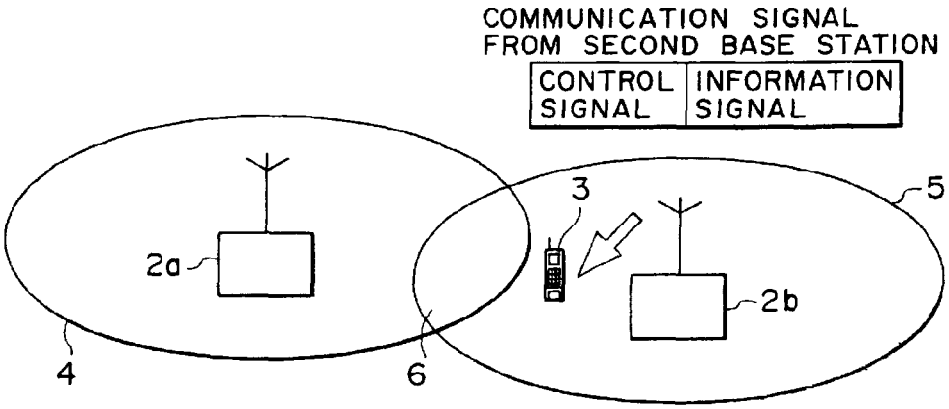
FIG. 1C is a schematic view illustrating a forward link signal transmitted from the second base station to the mobile station when the mobile station is positioned in a second region.

Referring first to FIGS. 1(a) to 1(c), there is shown a mobile radio communication system to which the present invention is applied. The mobile radio communication system is a cellular system which includes a plurality of base stations 2 (2a and 2b) and a plurality of mobile stations 3 being interconnected by a direct spread CDMA (Code Division Multiple Access) system. In the present embodiment, only a relationship among the first base station 2a, a mobile station 3 and the second base station 2b is described for simplified description.

When the mobile station 3 is positioned in a first region 4 as shown in FIG. 1A, the first base station 2a communicates a reverse link signal and a forward link signal with the mobile station 3. The first base station 2a transmits a forward link signal including a control signal such as a transmission power control signal for the mobile station 3 and so forth and an information signal such as voice data to the mobile station 3.

Similarly to the first base station 2a described above, the second base station 2b communicates a reverse link signal and a forward link signal with the mobile station 3 when the mobile station 3 is within a second region 5.

A transmission power control signal is a signal for adaptively varying the transmission power level of a reverse link signal, so that the mobile station 3 can transmit the reverse link signal with a suitable power level to the first base station 2a or the second base station 2b.

Figure 2:
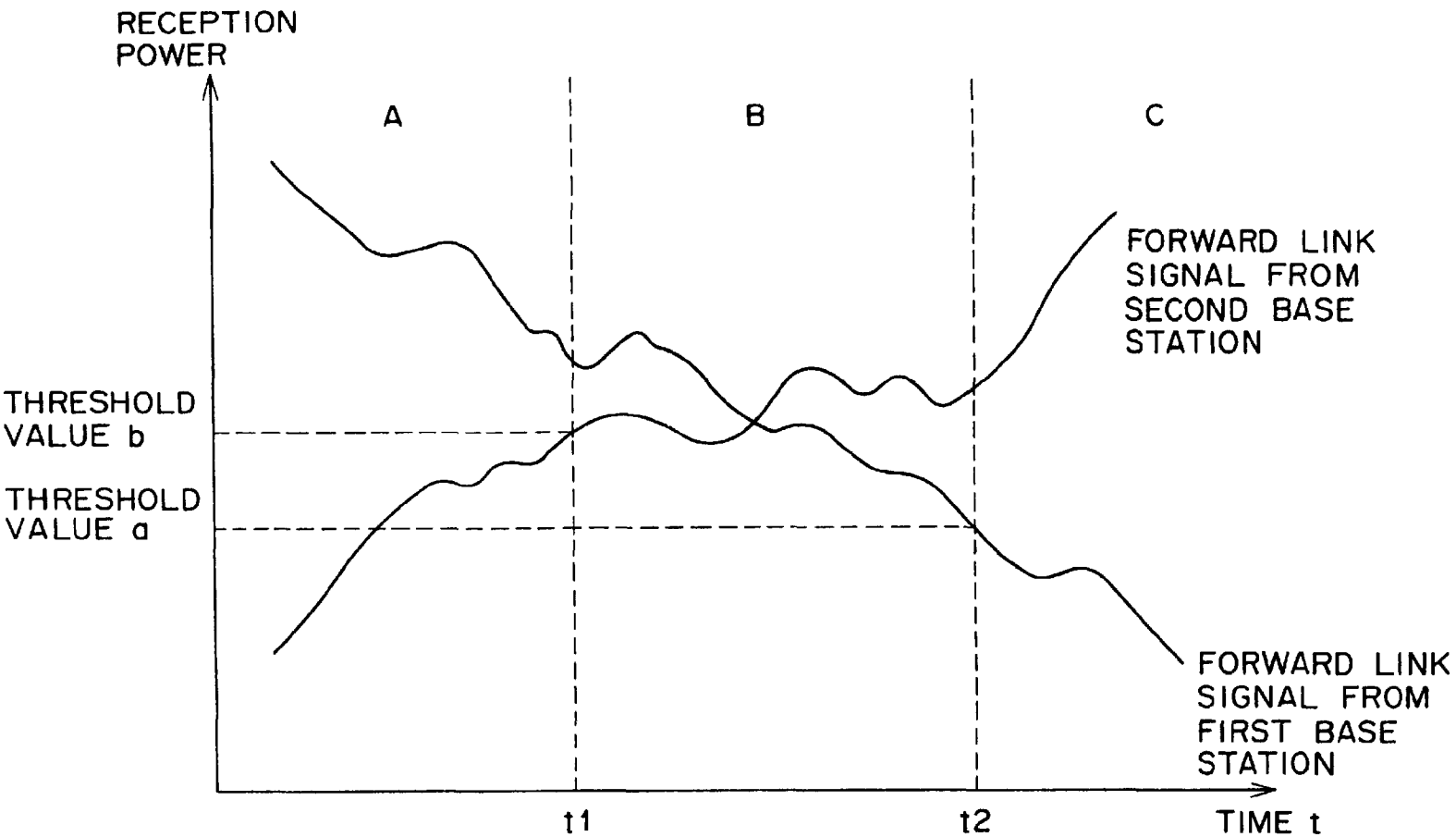
FIG. 2 is a diagram illustrating reception powers of the first and second base stations when the mobile station moves from the first region to the overlapping region and then to the second region.

When the mobile station 3 is positioned in the first region 4 as seen in FIG. 1A, it receives a forward link signal from the first base station 2a and transmits a reverse link signal to the first base station 2a. In this instance, the reception power of the mobile station 3 is such that, as seen from a region A in FIG. 2, the reception power of the forward link signal from the first base station 2a is equal to or higher than a threshold value a and the reception power of the forward link signal from the second base station 2b is equal to or lower than another threshold value b. Accordingly, the mobile station 3 receives and demodulates only the forward link signal from the first base station 2a.

On the other hand, when the mobile station 3 moves from the first region 4 toward the second region 5 and comes to a position within an overlapping region 6 between the first region 4 and the second region 5 as seen in FIG. 1B, hand-off is required and a soft hand-off state is entered wherein forward link signals are transmitted from both of the first base station 2a and the second base station 2b. In this instance, the reception power of the mobile station 3 from the second base station 2b reaches the threshold value b at time t1 as seen in a region B of FIG. 2. Then, the mobile station 3 receives the forward link signals from both of the first base station 2a and the second base station 2b. As the mobile station 3 further moves from the first base station 2a toward the second base station 2b, the reception power of the forward link signal from the second base station 2b soon becomes higher than the reception power of the forward link signal from the first base station 2a, and then at time t2, the reception power from the first base station 2a reaches the other threshold value a. Thereafter, the mobile station 3 does not receive the forward link signal from the first base station 2a any more, but receives the forward link signal from the second base station 2b. In other words, in the region B where time shifts from t1 to time t2, the mobile station 3 is entered in a soft hand-off state wherein it receives and demodulates the forward link signals from both of the first base station 2a and the second base station 2b.

Then, when the mobile station 3 further moves from the overlapping region 6 to the second region 5 and is positioned in the second region 5 as seen in FIG. 1C, the mobile station 3 receives the forward link signal from the second base station 2b and transmits its reverse link signal to the second base station 2b. In this instance, as described hereinabove, as the mobile station 3 moves from the first base station 2a toward the second base station 2b, the reception power of the mobile station 3 varies such that the reception power of the forward link signal from the second base station 2b becomes equal to or higher than the threshold value b while the reception power of the forward link signal from the first base station 2a becomes equal to or lower than the threshold value a. Accordingly, the mobile station 3 receives and demodulates only the forward link signal from the second base station 2b.

It is to be noted that the mobile radio communication system 1 may alternatively adopt another system (Mobile Assisted Hand Off: MAHO) wherein, when the mobile station 3 moves from the first region 4 into the overlapping region 6, an instruction to enter hand-off processing is outputted from the mobile station 3 side, or may adopt still another system wherein an instruction to enter a hand-off state is issued from the base stations 2 side. Thus, for the process of transition to a hand-off state from an ordinary state wherein the mobile station 3 is connected to the first base station 2a and the second base station 2b, any system may be employed. Also, the mobile radio communication system 1 may adopt any system for the process of transition from a hand-off state to an ordinary state.

Now, an example of different hand-off processes performed in response to different kinds of signals when a mobile station successively moves from the first region 4 to the overlapping region 6 and to the second region 5 as described hereinabove with reference to FIGS. 1(a), 1(b) and 1(c) is described. It is to be noted that, in the following description, hand-off processes for an information signal and a control signal, particularly a transmission power control signal, are described.

When the mobile station 3 is positioned in the first region 4 as shown in FIG. 1A, it receives a transmission power control signal as a forward link control signal and an information signal from the first base station 2a. The mobile station 3 demodulates the received transmission power control signal and the information signal. The mobile station 3 controls its transmission power, with which a reverse link signal is to be transmitted to the first base station 2a, based on the transmission power control signal obtained by the demodulation.

Further, when the mobile station 3 is positioned in the overlapping region 6 as shown in FIG. 1B, it enters a hand-off mode, in which forward link signals of substantially same contents are transmitted from both the first base station 2a and the second base station 2b to the mobile station 3. In this instance, to the mobile station 3, both a transmission power control signal and an information signal are transmitted from the first base station 2a, and only a transmission power control signal is transmitted from the second base station 2b. In other words, in the overlapping region 6, the mobile station 3 is in a soft hand-off state wherein it is connected to the first base station 2a, and the second base station 2b with regard to a transmission power control signal. Thus, the mobile station 3 receives and demodulates the transmission power control signal and the information signal transmitted from the first base station 2a and the transmission power control signal transmitted from the second base station 2b separately from each other. Further, when the mobile station 3 receives the transmission power control signal transmitted from the first base station 2a and the transmission power control signal transmitted from the second base station 2b, it compares contents of the transmission power control signal received from the first base station 2a and the second base station 2b with each other and then determines an operation to be performed based on a result of the comparison. With regard to a transmission power control signal, the mobile station 3 determines an operation to be performed based on a result of a combination of the control signal from the first base station 2a and the transmission power control signal from the second base station 2b.

More particularly, the mobile station 3 normally controls the transmission power of a reverse link signal thereof to be transmitted to the first base station 2a or the second base station 2b such that it increases its transmission power of the reverse link signal only when the transmission power control signals transmitted from both the first base station 2a and the second base station 2b indicate "up". Otherwise, the mobile station 3 maintains or decreases the transmission power to control the transmission power of a reverse link signal to be transmitted to the first base station 2a or the second base station 2b. It is to be noted that, when transmission power control signals are transmitted to the mobile station 3 in other combinations or in a different combination where a plurality of base stations and mobile stations 3 are present, the transmission power may be controlled in accordance with a system conforming to the IS-95 of Qualcomm.

It is to be noted that, with regard to a control signal other than a transmission power control signal, the mobile station 3 demodulates the control signals transmitted from the first base station 2a and the second base station 2b and adopts the modulation signal which exhibits a higher reception power. Further, in the case where forward link signals transmitted include error correction codes, amplitude values of the forward link signals should be added simply thereto and inputted to a soft decision decoder. By this operation, the mobile station 3 can reduce the error rate of the control signals and can augment the response performance to a command given by the first base station 2a or the second base station 2b.

The mobile station 3 enters into an ordinary state from a hand-off state in the overlapping region 6 when it moves from the overlapping region 6 to the second region 5 as shown in FIG. 1C. Thereupon, a forward link signal including a transmission power control signal and an information signal is transmitted from the second base station 2b to the mobile station 3. Then, similarly as in the case wherein the mobile station 3 is positioned in the first region 4 described hereinabove, the mobile station 3 receives and demodulates the forward link signal and controls the transmission power with which a reverse link signal is to be transmitted to the second base station 2b based on the transmission power control signal.

As described above, in the present mobile radio communication system 1, when the mobile station 3 is positioned in the overlapping region 6 and is to be put into a hand-off state, transmission power control signals are transmitted from both of the first base station 2a and the second base station 2b to the mobile station 3. Consequently, the mobile station 3 enters a soft hand-off state for controlling the transmission power based on a combination of the control signals from both of the base stations 2. On the other hand, with regard to an information signal of voice information and so forth, the mobile station 3 enters a hard hand-off state wherein it receives an information signal from only one of the base stations.

In this manner, with the mobile radio communication system 1, when the mobile station 3 is in a hand-off state, it is entered in a soft hand-off state wherein an information signal from only one of the base stations 2 is transmitted to the mobile station 3 and transmission power control signals are transmitted from both of the base stations 2. Consequently, when compared with an alternative system wherein a soft hand-off state is established by transmitting information signals and transmission power control signals separately from each other from both of the base stations 2, possible interference with the other mobile stations 3 included in the system can be reduced because information signals are transmitted from a plurality of the base stations 2 toward the mobile station 3. Further, with the mobile radio communication system 1, since control signals arc transmitted from the plurality of base stations to the mobile station 3 when the mobile station 3 is in a hand-off state, when compared with another system wherein hard hand-off is performed in the overlapping region 6, the reliability of the control signals can be augmented. Particularly with regard to a transmission power control signal, since the mobile station 3 is in a soft hand-off state, it is also possible to control the transmission power of the mobile station 3 from the second base station 2b described above, and it can be prevented that a reverse link signal is transmitted from the mobile station 3 with a transmission power which cannot be anticipated by the second base station 2b.

Further, with the mobile radio communication system 1, when the mobile station 3 is positioned in the overlapping region 6, since the mobile station 3 is put into a soft hand-off state with regard to a control signal, but is put into a hard hand-off state with regard to an information signal, the communication capacity of the entire system can be augmented. For example, even if the communication capacity of the second base station 2b in the mobile radio communication system 1 is fully used, since only a transmission power control signal is required to be transmitted from the second base station 2b to the mobile station 3, the influence upon the other mobile stations 3 in transmission of an information signal or a control signal can be reduced. Accordingly, with the present mobile radio communication system 1, interference with signals communicated by the second base station 2b can be suppressed, and when the mobile station 3 moves from the first region 4 into the second region 5, hard hand-off can be performed such that an information signal is communicated between the second base station 2b and the mobile station 3 finally using a frequency channel different from the frequency channel which has been used in the first region 4.

Now, an example where the first base station 2a and the second base station 2b have such a threshold value as specified in Table 1 below is described.

TABLE 1

| Connected number to second base station | Operation mode of second base station |
|---|---|
| Nfull | Hard hand-off is performed between frequencies after soft hand-off state is entered with regard only to transmission power control signal |
| Nfull to Nth | Only transmission power control signal is transmitted to establish soft hand-off state, but no information signal is transmitted |

TABLE 1-continued

| Connected number to second base station | Operation mode of second base station |
|---|---|
| Nth to Nempty | Transmission power control signal and information signal are transmitted to establish soft hand-off state with regard to both of them |

This Table 1 is stored, for example, in memories built in the first base station 2a and the second base station 2b and is read, for example, by a CPU so that the CPU may perform processing based on the threshold value. This Table 1 illustrates an example of hand-off processing of the base station 2a or the base station 2b for the mobile station 3 positioned in the overlapping region 6 described above when the connected number of mobile stations 3 is stored as a threshold value Nth.

According to Table 1, when the connected number of mobile stations 3 to the second base station 2b reaches a peak value Nfull, the mobile station 3 positioned in the overlapping region 6 between the first base station 2a and second base station 2b is put into a soft hand-off state with regard to a transmission power control signal. On the other hand, with regard to an information signal, hard hand-off is performed using a frequency channel different from that of the first base station 2a.

When the connected number of mobile stations to the second base station 2b is within a range from the peak value Nfull to the threshold value Nth, the mobile station 3 positioned in the overlapping region 6 between the first base station 2a and the second base station 2b is put into a soft hand-off state only with regard to a transmission power control signal. On the other hand, the second base station 2b does not transmit an information signal to the mobile station 3.

When the connected number of mobile stations to the second base station 2b is smaller than the threshold value Nth and consequently the communication capacity of the second base station 2b has a considerable free area, the mobile station 3 positioned in the overlapping region 6 is put into a soft hand-off state with regard to both of a transmission power control signal and an information signal.

Operation of the first base station 2a and the second base station 2b when such threshold value Nth is held by both of the first base station 2a and the second base station 2b described above and when a certain mobile station 3 moves from the first region 4 into the second region 5 is described.

Figure 3A:
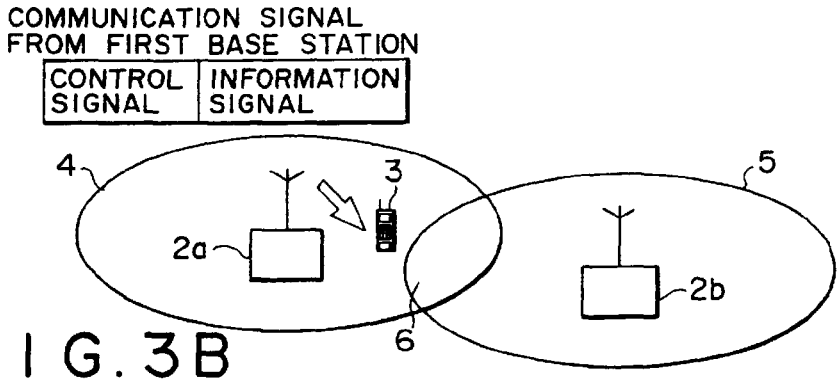
FIG. 3A is a schematic view illustrating a forward link signal transmitted from the first base station to the mobile station when the mobile station is positioned in the first region.

First, when the mobile station 3 is positioned in the first region 4, a control signal and an information signal are transmitted only from the first base station 2a to the mobile station 3 as seen in FIG. 3A.

Figure 3B:
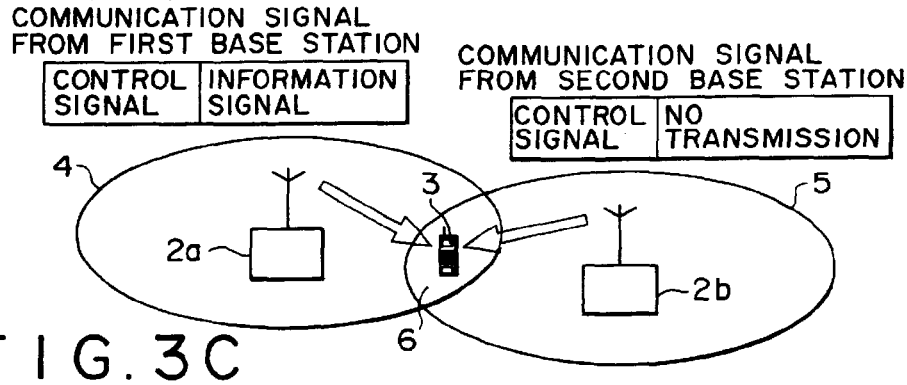
FIG. 3B is a schematic view illustrating forward link signals transmitted from the first and second base stations to the mobile station when the mobile station is positioned in the overlapping region and the number of connected mobile stations to the second base station is equal to or larger than a threshold value Nth.
Figure 3C:
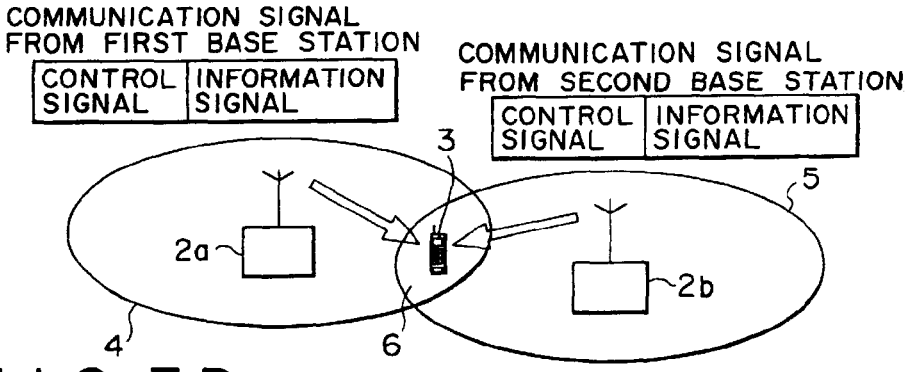
FIG. 3C is a schematic view illustrating forward link signals transmitted from the first and second base stations to the mobile station when the mobile station is positioned in the overlapping region and the number of connected mobile stations to the second base station is equal to or smaller than the threshold value Nth.

Then, when the mobile station 3 moves toward the second base station 2b and is positioned in the overlapping region 6, the second base station 2b performs hand-off processing in response to the threshold value Nth held in Table 1 above. In particular, if the connected number of mobile stations 3 in the second region 5 to the second base station 2b is greater than the threshold value Nth, then the second base station 2b puts the mobile station 3 into a soft hand-off state only with regard to a control signal, but puts, with regard to an information signal, the mobile station 3 into a hard hand-off state in which a signal is transmitted from only one of the base stations 2 as seen in FIG. 3B. Particularly with regard to a control signal, the mobile station 3 is preferably put into a soft hand-off state with regard to a transmission power control signal.

Further, when the connected number of mobile stations 3 in the second region 5 to the second base station 2b is equal to or lower than the threshold value Nth, the second base station 2b transmits a control signal and an information signal to the mobile station 3 to put the mobile station 3 into a soft hand-off state with regard to a control signal and an information signal. Here, if the connected number of mobile stations 3 to the second base station 2b becomes greater than the threshold value Nth, then the operation returns to that for the pertaining case described hereinabove wherein the threshold value Nth is exceeded.

Figure 3D:
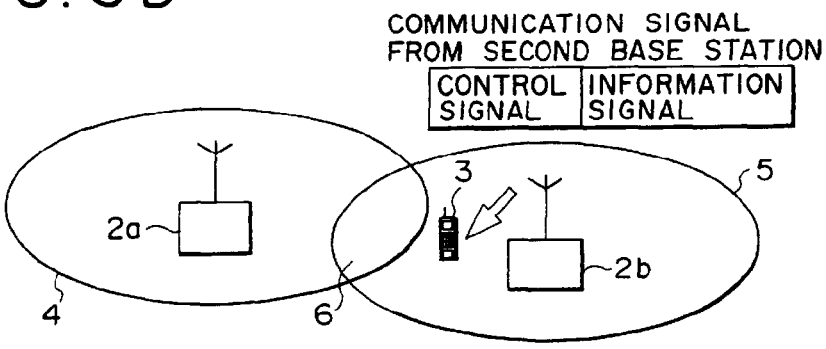
FIG. 3D is a schematic view illustrating a forward link signal transmitted from the second base station to the mobile station when the mobile station is positioned in the second region.

Then, when the mobile station 3 moves from the overlapping region 6 into the second region 5, a control signal and an information signal are transmitted from the second base station 2b to the mobile station 3 as seen in FIG. 3D.

In this manner, with the present mobile radio communication system 1, when the communication capacities of both base stations have some free areas, soft hand-off processing can be performed with regard to both of a control signal and an information signal, and consequently, a high communication quality can be assured.

It is to be noted that, where only one value is prepared for the threshold value Nth, the mobile radio communication system 1 may possibly repeat soft hand-off processing and hard hand-off processing with regard to an information signal. However, for example, a hysteresis may be provided so that soft hand-off processing and hard hand-off processing may not alternatively be repeated rapidly.

Subsequently, an example wherein the first base station 2a and the second base station 2b described above have such a threshold value as specified in Table 2 below is described.

TABLE 2

| Communication quality of second base station | Operation mode of second base station |
|---|---|
| Qworst | Hard hand-off is performed between frequencies after soft hand-off state is entered with regard only to transmission power control signal |
| Qworst to Qth | Only transmission power control signal is transmitted to establish soft hand-off state, but no information signal is transmitted |
| Qth to Qbest | Transmission power control signal and information signal are transmitted to establish soft hand-off state with regard to both of them |

This Table 2 is stored, for example, in the memories built in the first base station 2a and the second base station 2b similarly to Table 1 described hereinabove and, for example, is read by a CPU so that the CPU may perform processing based on the threshold value. This Table 2 illustrates an example of hand-off processing of a base station for the mobile station 3 positioned in the overlapping region 6 described above when it is held as the threshold value Qth with regard to the communication quality. Here, the communication quality is a communication equality of the entire communication performed by those base stations 2 which are performing hand-off processing for a certain mobile station 3.

According to Table 2, if a certain base station 2b determines that the communication quality is the worst Qworst, then it puts the mobile station 3 positioned in the overlapping region 6 with another base station into a soft hand-off state only with regard to a transmission power control signal. With regard to an information signal, the second base station 2b performs hard hand-off processing using a frequency channel different from the frequency which has been used by the first base station 2a to which the mobile station 3 has belonged formerly.

If the second base station 2b determines that the communication quality is within a range from the worst Qworst to the threshold value Qth, then it puts the mobile station 3 positioned in the overlapping region 6 with the other first base station 2a into a soft hand-off state only with regard to a transmission power control signal. On the other hand, the second base station 2b does not transmit an information signal to the mobile station 3.

If the second base station 2b determines that the communication quality is lower than the threshold value Qth, then it puts the mobile station 3 positioned in the overlapping region 6 into a soft hand-off state with regard to both a transmission power control signal and an information signal.

Since the mobile radio communication system 1 holds the threshold value Qth for the communication quality in this manner, the characteristics of the entire system, that is, the stability and the communication quality of the system, can be augmented. It is to be noted that the mobile radio communication system 1 may have a threshold value Qth for the communication quality of the entire base stations 2 which perform hand-off processing and further have threshold values for the communication quality such as S/N ratios of signals transmitted from and received by the individual base stations 2.

Further, with the present mobile radio communication system 1, since a threshold value for the connected number of mobile stations 3 or the communication quality is held in the base stations 2 and, even when the communication capacity of the system is used fully, at least a transmission power control signal can be transmitted to each mobile station 3, the second base station 2b of the destination of hand-off can transmit a transmission power control signal, and the second base station 2b will not receive a signal of an unexpected transmission power from the mobile station 3. In other words, with the present mobile radio communication system 1, for example, when a mobile station 3 moves from the first region 4 into the second region 5, even if the communication capacity of the second base station 2b is fully used, the second base station 2b can transmit a transmission power control signal to the mobile station 3 when the mobile station 3 is positioned in the overlapping region 6. Consequently, such a situation that the level of the transmission power from the mobile station 3 is so high that it interferes with a communication signal being communicated by the second base station 2b can be prevented, and accordingly, communication of the mobile station 3 can be optimized. Further, also when the mobile station 3 moves from the overlapping region 6 into the second region 5, the second base station 2b can receive an information signal from the mobile station 3 with a suitable transmission power.

Figure 4A:
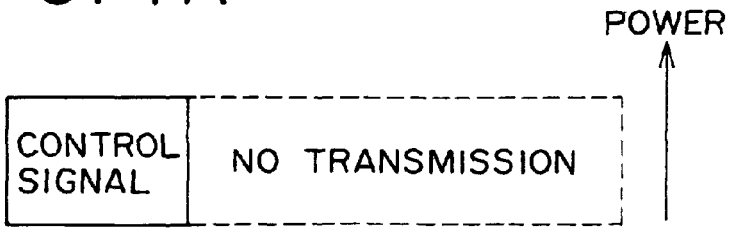
FIG. 4A is a diagrammatic view illustrating a forward link signal transmitted from the second base station to the mobile station when soft hand-off is performed only for a control signal.
Figure 4B:
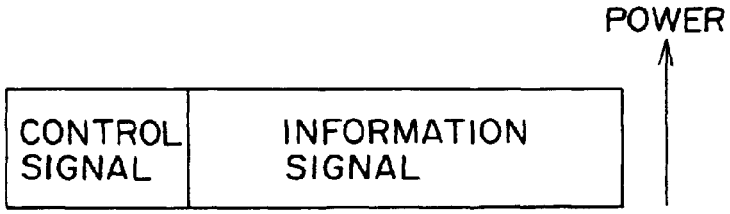
FIG. 4B is a diagrammatic view illustrating a forward link signal transmitted from the second base station to the mobile station in accordance with the related art IS-95 system.
Figure 4C:
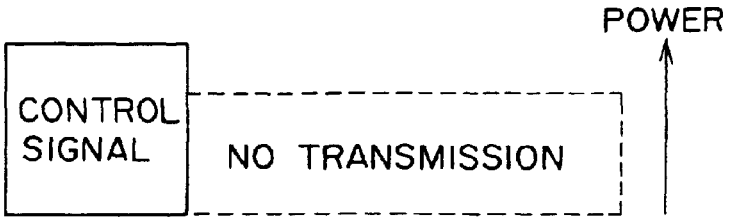
FIG. 4C is a diagrammatic view illustrating a forward link signal transmitted from the second base station to the mobile station with its transmission power increased when soft hand-off is performed only for a control signal.
Figure 5:
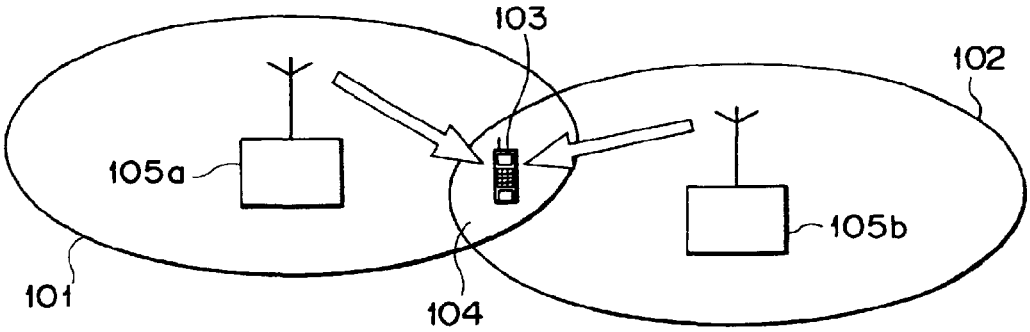
FIG. 5 is a schematic view illustrating hand-off processing in a related art cellular system.

Further, while, in the mobile radio communication system 1 described above, hand-off processing is performed by transmitting only a control signal as seen in FIG. 4A to the mobile station 3 positioned in the overlapping region 6, the transmission power of a control signal to be transmitted to the mobile station 3 may be made high as seen in FIG. 4C as compared with the case wherein both a control signal and an information signal are transmitted to the mobile station 3 as seen in FIG. 4B. Particularly, with the present mobile radio communication system 1, preferably the transmission power of a transmission power control signal in a control signal is set high.

In this manner, with the mobile radio communication system 1, when a mobile station 3 is put into a soft hand-off state only with regard to a control signal, the reception error rate of a transmission power control signal of the mobile station 3 can be reduced by increasing the transmission wave power of a control signal such as a transmission power control signal. Accordingly, with the mobile radio communication system 1, although the communication capacity is decreased a little by increasing the transmission wave power of a transmission power control signal, the stability of the entire system can be augmented. It is to be noted that, with the present mobile radio communication system 1, even if the transmission wave power of a transmission power control signal is increased, since soft hand-off processing is performed only with regard to a control signal while hard hand-off processing is performed with regard to an information signal, even if the transmission wave power is increased, interference with another signal in the entire system can be suppressed.

While a preferred embodiment of the present invention has been described using specific terms, such description is for illustrative purposes only, and it is to be understood that changes and variations may be made without departing from the spirit or scope of the following claims.

What is claimed is:

1. A mobile radio communication system, comprising:

at least two adjacent base stations;

a mobile station movable between cells formed by and connectable to the base stations; and means for performing transmission power control whereby, when the mobile station and the base stations are connected to each other, soft hand-off control is performed for a control signal, and hard hand-off control is performed for signals other than the control signal,

*wherein each of the base stations includes connection number supervision means for counting the number of mobile stations connected to a base station, the connection number supervision means causing soft hand-off control to be performed only for the control signal when the number of connected mobile stations is greater than a predetermined threshold value and to be performed for both the control signal and for the signals other than the control signal when the number of connected mobile stations is equal to or less than the predetermined threshold value.*

2. The mobile radio communication system according to claim 1, wherein each of the base stations transmits as the control signal a transmission power control signal for the mobile station and performs soft hand-off control for the transmission power control signal.

[3. The mobile radio communication system according to claim 1, wherein each of the base stations includes connection number supervision means for counting the number of mobile stations connected to a base station, the connection number supervision means causing soft hand-off control to be performed only for the control signal when the number of connected mobile stations is greater than a predetermined threshold value and to be performed for both the control signal and for the signals other than the control signal when the number of connected mobile stations is equal to or less than the predetermined threshold value.]

4. [The] *A* mobile radio communication [system according to claim 1], *comprising:*

*at least two adjacent base stations;*

*a mobile station movable between cells formed by and connectable to the base stations; and*

*means for performing transmission power control whereby, when the mobile station and the base stations are connected to each other, soft hand-off control is performed for a control signal, and hard hand-off control is performed for signals other than the control signal,* wherein each of the base stations includes quality supervision means for supervising a signal quality to/from the mobile station, the quality supervision means causing soft hand-off control to be performed only for the control signal when the signal quality is greater than a predetermined threshold value and to be performed for both the control signal and for the signals other than the control signal when the signal quality is equal to or less than the predetermined threshold value.

5. The mobile radio communication system according to claim 1, wherein each of the base stations sets, when hard hand-off control is to be performed for the signals other than the control signal, a control signal level that is higher than the control signal level used when soft hand-off control is performed for the signals other than the control signal.

6. The mobile radio communication system according to claim 1, wherein the mobile station and the base stations are connected to each other by a code division multiplex access system.

7. A mobile station for a mobile radio communication system wherein the mobile station is movable between cells formed by at least two adjacent base stations; and the mobile station and the base stations are connectable to each other, the mobile station comprising:

means for performing soft hand-off control for control signals transmitted from the base stations and for performing hard hand-off control for information signals transmitted from the base stations,

*wherein soft hand-off control to be performed only for the control signal when the number of connected mobile stations to a respective base station is greater than a predetermined threshold value and to be performed for both the control signal and for the signals other than the control signal when the number of connected mobile stations is equal to or less than the predetermined threshold value.*

8. The mobile station according to claim 7, wherein the mobile station and the base stations are connected to each other by a code division multiplex access system.

9. The mobile station according to claim 7, wherein each of the base stations transmits, as a control signal, a transmission power control signal for controlling the transmission power of the mobile station and performs soft hand-off control for the transmission power control signal.

10. The mobile station according to claim 7, wherein the mobile station compares, when control signals are received from the base stations, contents of the control signals and determines an operation to be performed based on a comparison result of.

11. A base station among a plurality of adjacent base stations for a mobile radio communication system wherein the plurality of base stations and a mobile station movable between cells formed by the plurality of base stations are connectable to each other, the base station comprising:

means for performing soft hand-off control for control signals to be transmitted from the base station and for performing hard hand-off control for information signals to be transmitted from the base station, *and*

*connection number supervision means for counting a number of mobile stations connected thereto, and wherein the base station performs soft hand-off control only for a control signal when the number of connected mobile stations is greater than a predetermined threshold value and performs soft hand-off control for both the control signal and signals other than the control signal when the number of connected mobile stations is equal to or less than the predetermined threshold value.*

12. The base station according to claim 11, wherein the base station is adapted so that the mobile station and the plurality of base stations are connected to each other by a code division multiplex access system.

13. The base station according to claim 11, wherein the base station transmits, as a control signal, a transmission power control signal for controlling the transmission power of the mobile station and performs soft hand-off control for the transmission power control signal.

[14. The base station according to claim 11, further comprising connection number supervision means for counting a number of mobile stations connected thereto, and wherein the base station performs soft hand-off control only for a control signal when the number of connected mobile stations is greater than a predetermined threshold value and performs soft hand-off control for both the control signal and signals other than the control signal when the number of connected mobile stations is equal to or less than the predetermined threshold value.]

15. [The base station according to claim 11, further comprising] *A base station among a plurality of adjacent base stations for a mobile radio communication system wherein the plurality of base stations and a mobile station movable between cells formed by the plurality of base stations are connectable to each other, the base station comprising:*

*means for performing soft hand-off control for control signals to be transmitted from the base station and for performing hard hand-off control for information signals to be transmitted from the base station, and* quality supervision means for supervising a signal quality to/from the mobile station, whereby soft hand-off control is performed only for a control signal when the signal quality is higher than a predetermined threshold value and is performed for both the control signal and signals other than the control signal when the signal quality is equal to or less than the predetermined threshold value.

16. The base station according to claim 11, wherein the base station sets, when hard hand-off control is to be performed for signals other than a control signal, a control signal level higher than the control signal level used when soft hand-off control is performed for signals other than the control signal.

*17. The mobile radio communication system according to claim 4, wherein each of the base stations transmits as the control signal a transmission power control signal for the mobile station and performs soft hand-off control for the transmission power control signal.*

*18. The mobile radio communication system according to claim 4, wherein each of the base stations sets, when hard hand-off control is to be performed for the signals other than the control signal, a control signal level that is higher than the control signal level used when soft hand-off control is performed for the signals other than the control signal.*

*19. The mobile radio communication system according to claim 4, wherein the mobile station and the base stations are connected to each other by a code division multiplex access system.*

*20. A mobile station for a mobile radio communication system wherein*

*the mobile station is movable between cells formed by at least two adjacent base stations; and*

*the mobile station and the base stations are connectable to each other, the mobile station comprising:*

*means for performing soft hand-off control for control signals transmitted from the base stations and for performing hard hand-off control for information signals transmitted from the base stations,*

*wherein soft hand-off control to be performed only for the control signal when a signal quality is greater than a predetermined threshold value and to be performed for both the control signal and for the signals other than the control signal when the signal quality is equal to or less than the predetermined threshold value.*

*21. The mobile station according to claim 20, wherein the mobile station and the base stations are connected to each other by a code division multiplex access system.*

*22. The mobile station according to claim 20, wherein each of the base stations transmits, as a control signal, a transmission power control signal for controlling the transmission power of the mobile station and performs soft hand-off control for the transmission power control signal.*

*23. The mobile station according to claim 20, wherein the mobile station compares, when control signals are received from the base stations, contents of the control signals and determines an operation to be performed based on a comparison result of.*

*24. The base station according to claim 15, wherein the base station is adapted so that the mobile station and the plurality of base stations are connected to each other by a code division multiplex access system.*

*25. The base station according to claim 15, wherein the base station transmits, as a control signal, a transmission power control signal for controlling the transmission power of the mobile station and performs soft hand-off control for the transmission power control signal.*

*26. The base station according to claim 15, wherein the base station sets, when hard hand-off control is to be performed for signals other than a control signal, a control signal level higher than the control signal level used when soft hand-off control is performed for signals other than the control signal.*

* * * * *